JAMES E. BAIZE
ROBERT A. NOEL
INVENTORS

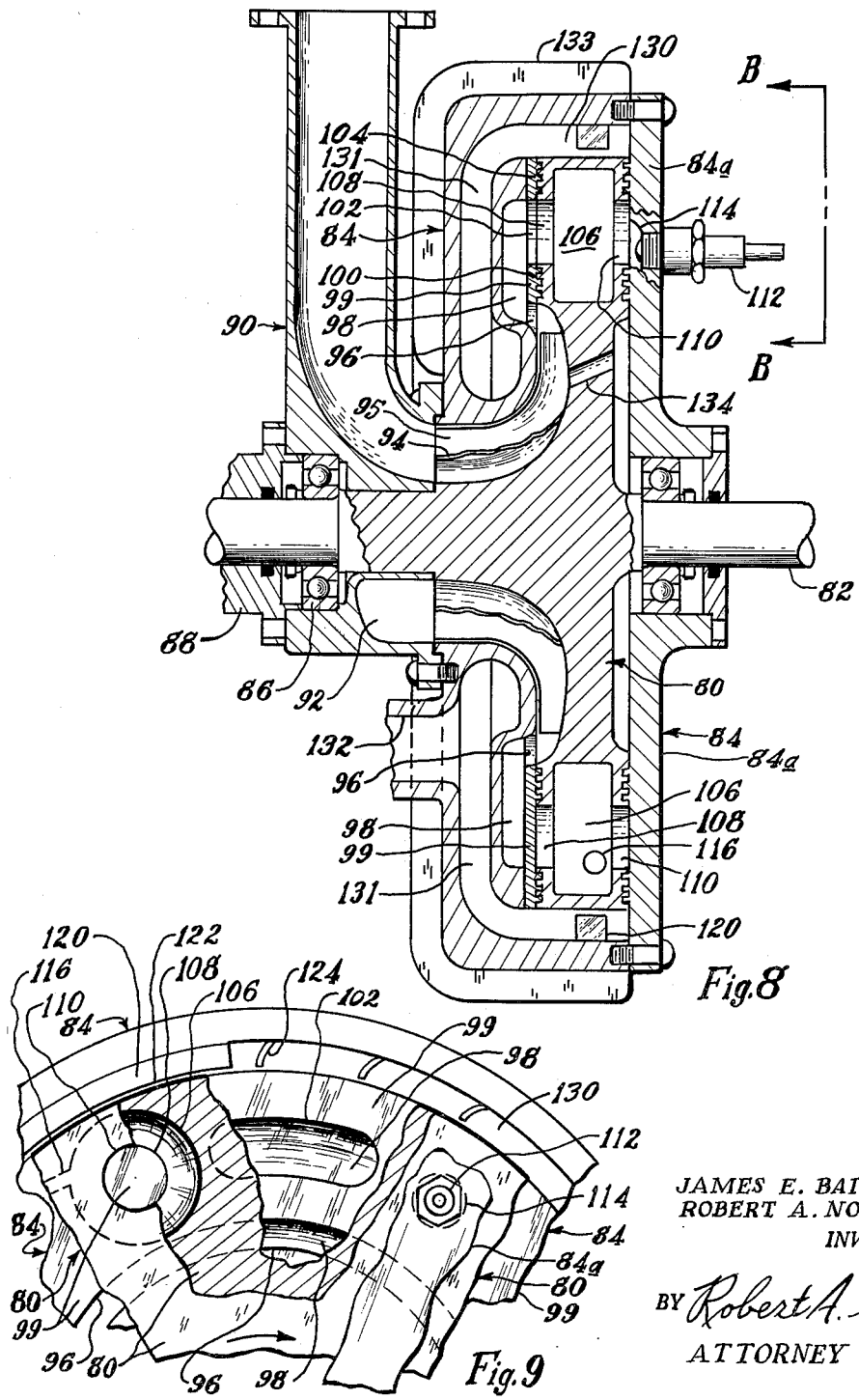

BY Robert A. Spray
ATTORNEY

July 24, 1962    J. E. BAIZE ETAL    3,045,427
INTERNAL COMBUSTION POWER MEANS
Filed May 2, 1960    5 Sheets-Sheet 5

JAMES E. BAIZE
ROBERT A. NOEL
INVENTORS

BY *Robert A. Spray*
ATTORNEY

3,045,427
Patented July 24, 1962

3,045,427
INTERNAL COMBUSTION POWER MEANS
James E. Baize, 6522 W. 14th St., and Robert A. Noel, 6154 Woodside Drive, both of Indianapolis, Ind.
Filed May 2, 1960, Ser. No. 26,307
8 Claims. (Cl. 60—39.34)

This invention relates to power units of internal combustion, rotary type.

More particularly, the present invention relates to novel power units of a type embodying a fixed stator casing and a revolving rotor, having one or more combustion chambers provided by the rotor between opposite sides of the stator, and which achieves a driving torque by the reaction from exhaust gases from the combustion chambers.

An important object and feature of the present invention is to provide an engine which will have essentially just one single moving part for the power generation, that part being a revolving rotor, which is integral with, or keyed or splined to, the drive shaft.

A further object and feature is the provision of an engine which is quite simple and economical of manufacture, assembly, and service.

Another object and feature is the provision of an engine which is light in weight, and which has a low weight-power ratio.

Another object of the invention is the provision of an effective rotary power unit which overcomes disadvantages of piston type engines by avoiding the necessity of reciprocating parts, permitting high drive-shaft speed, having no masses to counter-balance, and low end thrust.

In carrying out the invention in an illustrated embodiment, there is provided a rotor and a stator, and the rotor carries centrifugal compressor blading for supplying fuel-air under pressure to outer portions of the engine, where the fuel-air is communicated via porting and chamber features to one or more combustion chambers of the rotor. Reaction on the rotor, from exhaust gases directed through nozzles rearwardly upon subsequent firing of the fuel-air charge, imparts driving torque to the rotor. The power generation is achieved by the single moving part, the rotor, it being integral with, or keyed or splined to, the drive shaft.

The above description is quite introductory and general; and the above and other objects, features and advantages of the novel and advantageous invention will further appear from the following detailed description of embodiments of the invention, reference being had to the accompanying somewhat diagrammatic drawings, in which:

FIGURE 8 is an axial, sectional view of another embodiment of our invention, the rotor being shown in a second position as in FIG. 10;

FIGURE 9 is a fragmental detail taken along view-line B—B of FIG. 8, and diagrammatically illustrating the rotor in a first position of displacement, the stator and successive portions of the rotor shown broken away for illustrative purposes;

Figure 1:
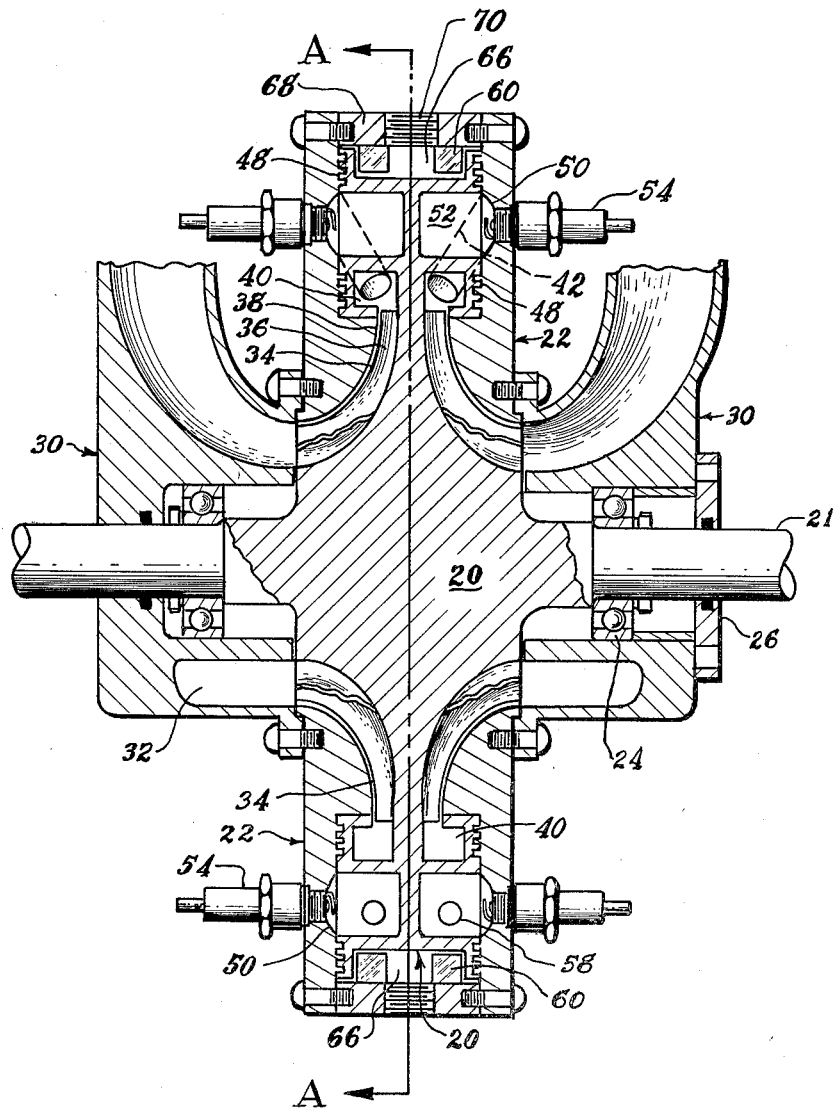
FIGURE 1 is an axial, sectional view of a power means according to one embodiment of the invention.

As illustrated by the embodiment of FIG. 1, an engine or power means according to the invention generally comprises a revolvable rotor 20, mounted on a shaft 21 and carried in a stator 22; and suitable bearings 24 and shaft seals 26 support and seal the rotor shaft, and provide for rotation of the rotor with respect to the stator. This rotation, of the rotor with respect to the stator, is, in a desirable embodiment, the only relative movement of the power components of the engine.

Fuel-air is supplied to the engine by a fuel-air inlet housing 30 shown bolted to the stator 22; and more specifically, in the form shown, the housing 30 supplies fuel-air from an annular fuel-air supply outlet 32 which faces a side face of the rotor 20.

Centrifugal compressor blading 34 is shown as carried on an outer face of the rotor 20, in an impeller chamber 36 shown provided between the rotor 20 and the inner face 38 of the stator 22. The blading 34 pulls the fuel-air through the outlet 32 of supply housing 30, through the impeller chamber 36, and supplies fuel-air under pressure to an intermediate rotor chamber 40.

Figure 2:
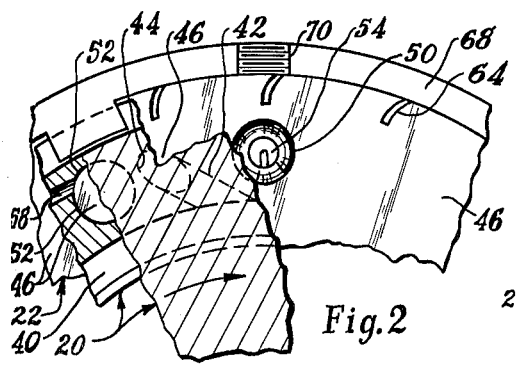
FIGURE 2 is a fragmental detail taken along the section line A—A of FIG. 1, and diagrammatically illustrating a rotor in a first position of displacement.

Intermediate rotor chamber 40, which is shown as of circumferentially-extending annular shape and lying internally of the rotor outwardly of the impeller blading 34, is shown as provided with an angularly-extending outlet passageway means 42 which opens to an outlet port 44 on a face of the rotor (see FIG. 2).

Looking now at FIG. 2, which illustrates the parts during a first position of rotor displacement, fuel-air cannot leave outlet port 44 in this initial position, because the port 44 is operatively sealed against an inner face 46 of the stator.

Inner and outer labyrinth seals 48 extend annularly between the rotor and stator in the radial vicinity of rotor outlet port 44 and related ports and chambers yet to be described, to aid and maintain the sealed relation of port 44 in this first (FIG. 2) position of rotor displacement, and to otherwise seal the rotor and stator as will be understood hereinafter.

Figure 3:
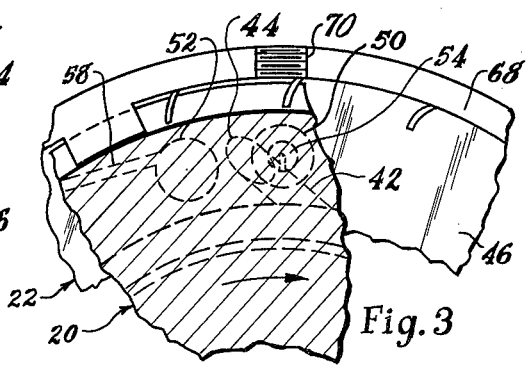
FIGURE 3 is a fragmental detail taken along the section line A—A of FIG. 1, and diagrammatically illustrating a rotor in a second position.

As the rotor 20 moves (clockwise in FIG. 2) from the first position shown in FIG. 2, to a second position shown in FIG. 3, the rotor outlet port 44 comes into registry with a stator chamber 50 which opens toward the rotor. Hence, it is seen that in the second rotor position (FIG. 3), fuel-air is supplied to the stator chamber 50 by the rotor port 44 registering therewith.

Figure 4:
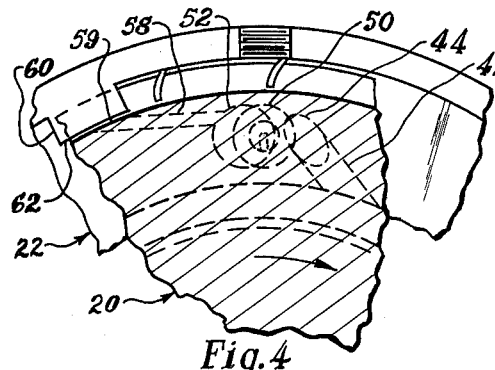
FIGURE 4 is a fragmental detail taken along the section line A—A of FIG. 1, and diagrammatically illustrating a rotor in a third position.

Further clockwise rotation of rotor 20 brings the rotor to a third position (FIG. 4), in which the rotor outlet port 44 is still in communication with stator chamber 50, but also the stator chamber 50 is communicating with a combustion chamber 52 of the rotor. Thus in this third position (FIG. 4), fuel-air is supplied to the combustion chamber 52, from rotor outlet port 44, by stator chamber 50 which straddles or overlies the two simultaneously; the stator chamber 50 thus serves as a shunt or intermediate stator chamber in delivering fuel-air to the rotor combustion chamber 52.

The combustion chamber 52, it will be observed, opens to the rotor face slightly angularly rearwardly of the outlet port 44. This displacement permits the fuel-air charge in combustion chamber 52 to be fired, as by a spark-plug 54 the electrodes of which are disposed in stator chamber 50, at a fourth rotor position (FIG. 5) in which the combustion chamber 52 is still registering with the stator chamber 50 but in which the rotor outlet port 44 has moved out of communication with stator chamber 50, thus preventing backfire through the system.

The rotor combustion chamber 52 is provided with an exhaust outlet means 58, which directs the exhaust gases in a rearward path, shown parallel to the general plane of the rotor, and generally perpendicular to a radial line drawn through the combustion chamber. Thus, the reaction force on the rotor, caused by the discharge of the exhaust gases through a discharge port 59 at the terminal end of outlet means 58, imparts a driving torque to the rotor.

Prior to the firing of the fuel-air charge, this exhaust outlet 58 is desirably sealed, preventing a premature venting of the compression pressure. As shown, this seal is effected by sealing blocks 60, which are carried by the stator 22, and which have a sealing face 62 closely adjacent the path of the outlet port 59 of the exhaust outlet 58 as the rotor moves along.

Figure 5:
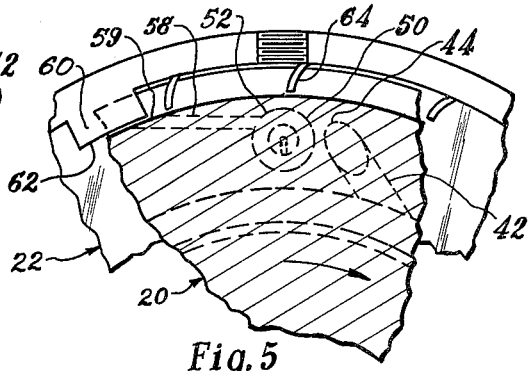
FIGURE 5 is a fragmental detail taken along the section line A—A of FIG. 1, and diagrammatically illustrating a rotor in a fourth position.

Each sealing block 60, with its sealing face 62, extends forwardly circumferentially far enough so as to operatively seal the exhaust port 59 until firing (FIG. 5).

Figure 6:
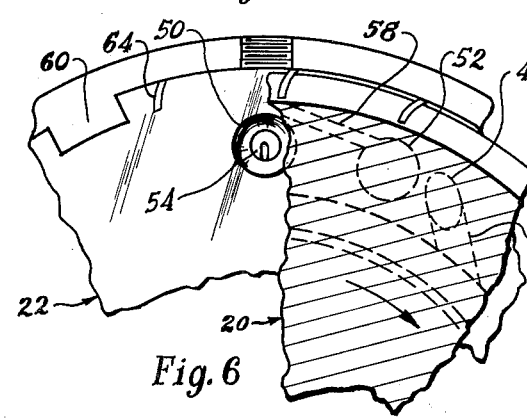
FIGURE 6 is a fragmental detail taken along the section line A—A of FIG. 1, and diagrammatically illustrating a rotor in a fifth position.

Reaction blading 64 is shown as carried by the stator 22, to be impinged upon by the exhaust gases being delivered through the exhaust outlet 58 and outlet port 59, after the rotor is in the fifth or post-firing position shown in FIG. 6.

The gases from exhaust outlet 58 and port 59 exhaust into an annular chamber 66 shown between the outer face of rotor 20 and the inner face of a stator ring 68 which extends between the opposite sides of the stator outwardly of the rotor, the chamber 66 providing in effect an exhaust manifold which is shown as vented to the atmosphere through exhaust ports 70 in the stator ring 68.

Figure 7:
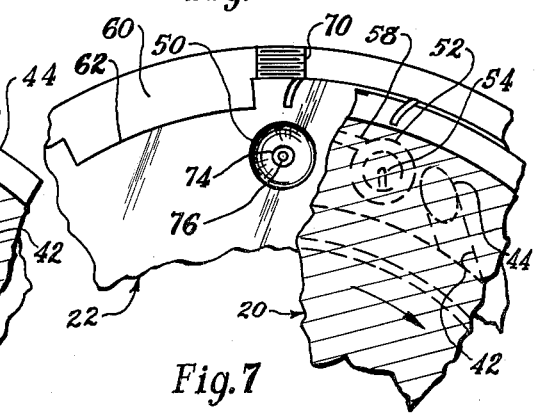
FIGURE 7 is a view similar to FIGS. 2 through 6, but illustrating a modification employing fuel-injection.

A modification employing fuel-injection is diagrammatically illustrated in FIG. 7. As is there shown, a fuel-injection nozzle 74 is carried by the stator 22, the tip 76 of the nozzle 74 being disposed in the stator chamber 50. Suitable means (not shown) are adapted to project a charge of fuel through nozzle tip 76 and into stator chamber 50 at a position of rotor displacement in which the rotor outlet port 44 has already moved beyond the stator chamber 50, but prior to the rotor position of FIG. 1.

Thereafter, in this fuel-injection embodiment, when the rotor has moved to the position shown in FIG. 7, in which the compression chamber 52 of rotor 20 has come into registry with the ignition plug 54, the ignition plug will be caused to fire the fuel-air charge in the combustion chamber 52.

In utilizing the FIG. 1 embodiment in a fuel-injection manner, it will be understood that air rather than fuel-air will be supplied to the rotor blading 34. Accordingly, the housing 30 may desirably be replaced by an air-scoop such as the scoop 146 in the embodiment illustrated in FIG. 13.

As is clear from FIG. 1, the components on each side of a central plane of the engine may be, and desirably are, identical; for brevity, however one side only has been described. In a desired embodiment, there are provided a plurality of combustion chambers 52 on each side of the central plane, with a plurality of ignition plugs 54 and associated stator chambers 50, spaced circumferentially around the stator. An advantage is that they may be fired simultaneously, yet the rotor thrust is balanced by the location of the various combustion chambers.

While the various stages and steps of the power cycle have been described as if they were quite distinct, in practice the user may find it desirable to permit some degree of overlap of stages.

FIGURE 8 illustrates a modified embodiment of the invention. As there shown, there is provided a rotor 80 carried on a shaft 82 within a stator 84. Suitable bearings 86 and shaft-seals 88 support and seal the rotor shaft and permit rotation with respect to the stator.

A fuel-air inlet housing 90, having an annular fuel-air supply outlet 92, supplies fuel-air to a side face of the rotor 80.

Centrifugal compressor blading 94 is shown mounted on a side face of the rotor 80 in an impeller chamber 95. This blading 94 pulls fuel-air through housing 90 and housing outlet 92, moves the fuel-air under pressure radially outwardly of the rotor face, and forces the fuel-air through an inlet port 96 of the stator 84 and into an intermediate stator chamber 98.

This stator chamber 98, in the embodiment shown, is annular in form and is circumferentially continuous. Its face which is presented toward the rotor is shown as covered over by a sealing plate 99.

A labyrinth seal 100 is shown as extending circumferentially between the rotor 80 and stator 84 outwardly of the ports 96, preventing flow of fuel-air outwardly along the rotor except through the stator inlet ports 96 which carry the charge to the stator chamber 98. The ports 96 extend substantially circumferentially, giving good flow characteristics.

The stator chamber 98, outwardly of the labyrinth seal 100, opens onto a side face of the rotor 80 through an elongated stator outlet port 102, the port 102 forming a portion of stator chamber 98; however, the rotor side-face, and the labyrinth seal 100 and the outlet labyrinth seal 104 between the rotor and stator, effectively seal off the stator outlet port 102 at a first position of rotor displacement, shown in FIG. 9.

Figure 10:
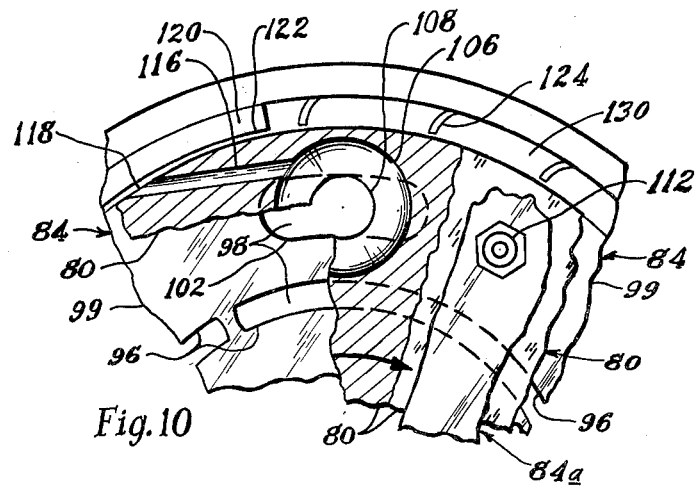
FIGURE 10 is a sectional view similar to FIG. 9, but illustrating the rotor in a second position, as in FIG. 8.

The rotor then moves to a second position, illustrated in FIG. 10, for charging as now explained. In FIG. 10, a combustion chamber 106 which is provided in the rotor 80 and which opens through an opening 108 to the face of the rotor adjacent the stator chamber 98, has moved to a second position of rotor displacement, in which opening 108 of combustion chamber 106 is in registry with one of the stator outlet ports 102. In this position, fuel-air will be supplied to the combustion chamber 106 via the stator chamber 98.

It will be observed, noting FIG. 8, that combustion chamber 106 opens not only to the rotor face adjacent the stator chamber 98 through rotor opening 108, but opens also on the opposite rotor face through rotor outlet 110, onto the opposite wall 84a of the stator. The fuel-air, which has been delivered into the combustion chamber 106, cannot pass outwardly through opening 110, however, because of the presence of the stator face 84a, and of the presence of inner and outer annular labyrinth seals 100 and 104 in the radial vicinity of rotor opening 110.

Figure 11:
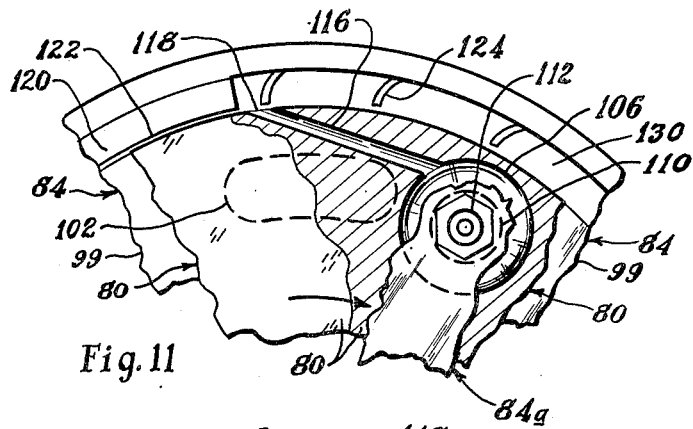
FIGURE 11 is a sectional view similar to FIG. 9, but illustrating the rotor in a third position.

Thereafter, after the rotor moves to a third position, as illustrated in FIG. 11, the combustion chamber 106 has moved to a position in which its opening 108 is no longer in registry with stator chamber outlet 102, but instead, the combustion chamber outlet opening 110 is in registry with an ignition means 112 carried by the stator 84. Specifically in the embodiment shown, the ignition means 112 is a glow-plug, the tip of which is disposed in a recess 114 which is in the stator wall 84a and which opens onto the rotor face. Firing occurs in this third position of rotor displacement (FIG. 11).

The rotor combustion chamber 106 is provided with an exhaust outlet means 116, which directs the gases rearwardly of the combustion chamber 106, parallel to the general plane of the rotor, and shown as generally perpendicular to a radial line drawn through the combustion chamber. Thus, the reaction force on the rotor, caused by the discharge of the exhaust gases through a discharge port 118, of exhaust outlet means 116, imparts a driving torque to the rotor.

Prior to the firing of the fuel-air charge, this exhaust outlet 118 is desirably sealed, preventing a premature venting of the compression pressure. As shown, this seal is effected by sealing blocks 120, which are carried by the stator 84, and which have sealing faces 122 closely adjacent the path of the outlet port 118 of the exhaust outlet 116.

Each sealing block 120, with its sealing face 122, extends forwardly circumferentially far enough so as to operatively seal the exhaust port 118 until firing (FIG. 11).

Reaction blading 124 is shown as carried by the stator 84, to be impinged upon by the exhaust gases being delivered through the exhaust outlet 116 and outlet port 118, after the rotor is in the firing position shown in FIG. 11.

The exhaust gases empty into an annular chamber 130 provided in the stator 84, outwardly of the rotor 80; and it will be noted that the exhaust chamber 130 extends inwardly interiorly of the stator along a radial passageway 131 which is in close heat-transfer proximity to the stator chamber 98. Thus, some of the heat of the exhaust gases is used to impart energy to the fuel-air charge disposed in the stator chamber 98, providing further economy and efficiency of the device.

After sweeping along passageway 131 past the stator chamber 98, the exhaust gases are allowed to flow outwardly from the stator through an exhaust port 132 in the stator wall. Cooling fins 133 (FIG. 2) dissipate heat from the stator.

Pressure-balance, across the rotor 80, is achieved by a bleed-port 134 (FIG. 8), which leads from the rotor face which has the blading 94 to the opposite rotor face, thereby reducing end thrust on the shaft bearings.

Figure 12:
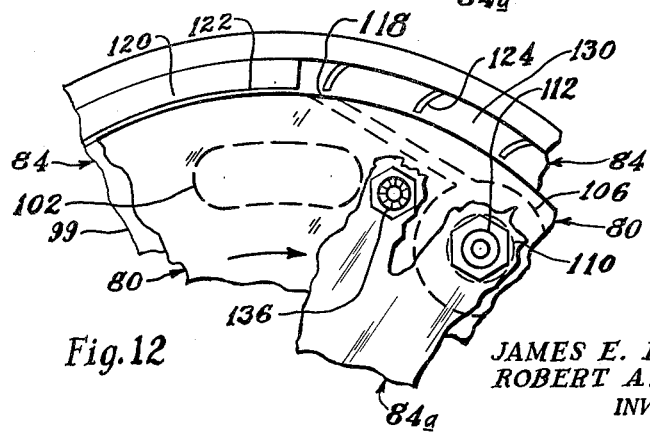
FIGURE 12 is a sectional view similar to FIG. 11, but illustrating a modification employing fuel-injection.

A fuel-injection modification of the embodiment is illustrated in FIG. 12. As is there shown, the ignition means 112 is relatively farther forward (clockwise) of the stator outlet port 102 than in FIG. 11, and the sealing block 120 is accordingly extended forwardly; and a fuel-injection nozzle 136 is disposed intermediate the outlet 102 and the ignition plug 112 to impart a charge of fuel to the rotor combustion chamber 106 in that intermediate angular position, after the combustion chamber is charged with compressed air from stator outlet 102 but before the position of ignition.

In this fuel-injection embodiment, it is understood that air rather than fuel-air will be delivered to the rotor blading 94. Accordingly, the housing 90 may desirably take a form such as that of an air-scoop 146 illustrated in the FIG. 13 embodiment.

This embodiment of FIGS. 8 through 12 may be provided with one or more combustion chambers spaced circumferentially around the rotor, depending on performance requirements.

Figure 13:
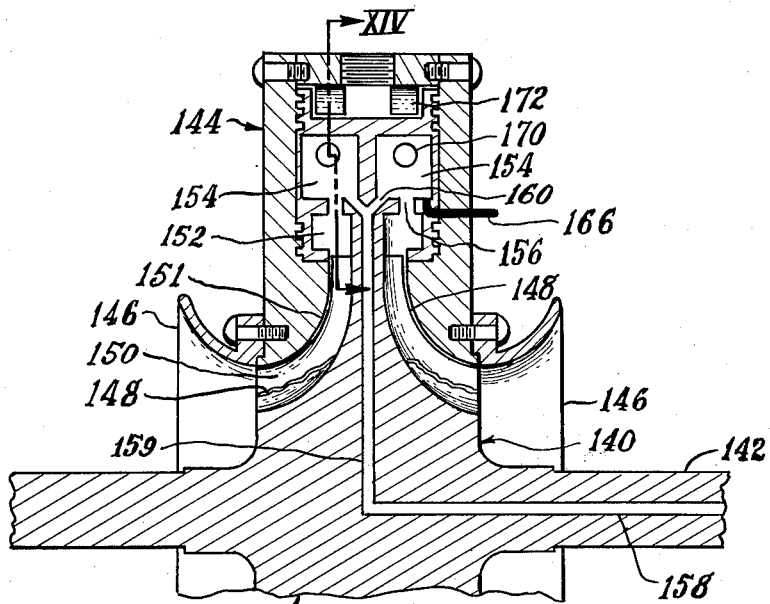
FIGURE 13 is an axial, sectional view of another embodiment of a power means according to our invention.

FIGURE 13 illustrates a third embodiment of the invention, which permits a continual flow of air and fuel into the combustion chamber or chambers. As shown in FIG. 13, this embodiment includes a rotor 140, having a shaft 142, and suitably mounted for rotation within a stator 144. There is shown in this embodiment a general symmetry of components on both sides of a central plane; but for brevity only one side will be described.

A bell-shaped air-scoop 146 is shown as bolted to the stator 144 to deliver air to a side face of the rotor 140. Centrifugal compressor blading 148 is shown as carried by the rotor 140 in an impeller chamber 150 provided between the rotor 140 and the adjacent face 151 of the stator 144. The blading 148 pulls the air through the air-scoop 146, through the impeller chamber 150, and delivers the air under pressure to an intermediate rotor chamber 152. The intermediate rotor chamber 152 shown is of circumferentially extending annular shape.

Outwardly of the rotor chamber 152, the rotor is provided with one or more combustion chambers 154, and in a desired embodiment the combustion chambers extend circumferentially around the rotor, there being a symmetry of chambers 152 on both sides of a central plane. Openings 156 communicate the intermediate chamber 152 with the chamber 154, permitting the supply of air under pressure to be delivered to the combustion chamber 154.

Fuel is supplied to the combustion chamber in this embodiment as shown by an axial fuel passageway 158 interiorly of the rotor shaft 142, which passageway 158 extends outwardly by one or more outwardly-directed branches 159 interiorly of the rotor itself, and terminates in a fuel outlet 160 which opens into the combustion chamber 154. Desirably, both the air and the fuel for combustion are delivered to the combustion chamber 154 continuously during rotor operation.

Firing of the fuel and air in the combustion chamber is effected by glow-plug or ignition means shown as comprised of an electrical resistance element 162, one end of which is grounded. This coil is energized by having its non-grounded end connected to a slip ring 164 insulatedly carried on a side face of the rotor, and electrically contacted by an ignition wire 166 insulatedly carried in the stator and pressed as by a spring 168 into electrical contact with the rotor ring 164.

Figure 14:
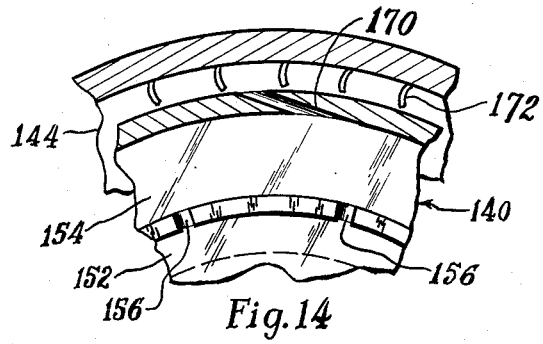
FIGURE 14 is a fragmental detail of the embodiment shown in FIG. 13, and taken along section line XIV thereof.
Figure 15:
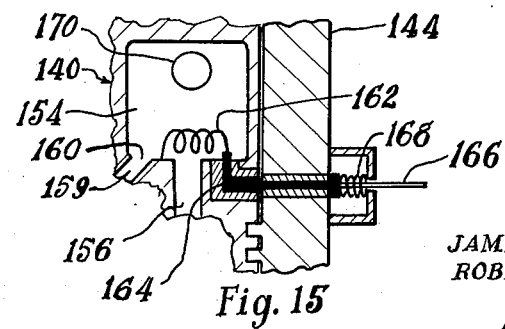
FIGURE 15 is an enlarged detail of a portion of FIG. 13.

The combustion chamber 154 is provided with one or more exhaust outlets 170, which direct the exhaust gases rearwardly, parallel to the general plane of the rotor, and shown in FIG. 14 as generally perpendicular to a radial line drawn through combustion chamber. Thus, the reaction force of the rotor, caused by the discharge of the exhaust gases, through the exhaust outlets 170 imparts a driving torque to the rotor. The firing is generally continuous, and the flow of exhaust gases is generally continuous, yielding a desired smoothness of operation and of torque output.

Reaction blading 172 is shown as carried by the stator 144, to be impinged upon by the exhaust gases delivered through the exhaust outlets 170.

A power unit according to these illustrative embodiments provides a novel engine having many advantages, whether used singly or in multiple units, and whether used with fuel-air mixture from an associated carburetor, or in a fuel-injection manner.

The single moving part concept provides simplicity and economy of construction, operation, and maintenance; and the engine is quite light in comparison to its power output. Low friction, low end thrust, and elimination of certain auxiliary timing mechanisms, valves, and the like, are among other advantages.

Accordingly, it will thus be seen from the foregoing description of the invention according to these illustrative embodiments, considered with the accompanying drawings, that the present invention provides a new and useful power means, having desired advantages and characteristics, and accomplishing its intended objects, including those hereinbefore pointed out and others which are inherent in the invention.

It will be understood that modifications and variations may be effected without departing from the scope of the novel concepts of the present invention; accordingly, our invention is not limited to the specific form or arrangement of parts herein described or shown.

Moreover, terms and expressions of the description and claims are to be broadly construed. For example, the term "fuel-air" is to be interpreted to refer to any component or components of the combustible charge; and while various stages and steps of the power cycle are set forth as being distinct, some over-lap may be advantageous and comes within the novelty of the concepts of the invention.

We claim as our invention:

1. An engine means, comprising: a rotor; a stator; the rotor provided with an intermediate annular chamber, and with centrifugal compressor blading for supplying fuel-air under pressure to said intermediate rotor chamber; the rotor provided with outlet passageway means communicating with said intermediate rotor chamber and opening to an outlet port provided on a face of the rotor; the stator facing said rotor face in a substantially sealed relationship in the radial vicinity of said rotor outlet port to operatively seal said rotor outlet port when said rotor is in a first position of angular displacement; the stator provided with a chamber which opens toward the rotor and communicable with said rotor outlet port at a second position of rotor displacement; the rotor being provided with a combustion chamber which opens to the rotor face slightly angularly rearwardly of the intermediate rotor chamber outlet port but at substantially the same radial distance from the axis of rotor rotation as the said stator chamber; the said rotor combustion chamber, and said intermediate rotor chamber outlet port, and said stator chamber being all in communication at a third position of rotor displacement to permit supplying of said rotor combustion chamber with fuel-air from said intermediate rotor chamber through said stator chamber; the rotor combustion chamber being provided with an exhaust outlet means leading rearwardly from the rotor to effect a reaction force on the rotor during a stage subsequent to the third position of rotor displacement and thereby effect a driving torque on the rotor; sealing means carried by the stator and operatively facing against the rotor face along the path of the outlet of said exhaust outlet means to operatively seal said exhaust outlet means during the third position of rotor displacement; ignition means for firing the fuel-air charge in said rotor combustion chamber, after the said intermediate rotor chamber outlet port has operatively moved out of communication with the said stator chamber, at a fourth position of rotor displacement; and reaction blading carried by the stator forwardly of the exhaust outlet sealing means of the stator, and adapted to be operatively impinged upon by the exhaust gases discharged from the combustion chamber.

2. An engine means, comprising: a rotor; a stator; the rotor provided with an intermediate annular chamber; means for supplying fuel-air under pressure to said intermediate rotor chamber; the rotor provided with outlet means communicating with said intermediate rotor chamber and opening to an outlet port provided on a face of the rotor; means operatively blocking said port at a first position of rotor displacement; the stator provided with a chamber opening toward the rotor and communicable with said rotor outlet port at a second position of rotor displacement; the rotor being provided with a combustion chamber opening to the rotor face and communicable with said stator chamber at a third position of rotor displacement to permit supplying of said rotor combustion chamber with fuel-air through said stator chamber; the rotor combustion chamber being provided with an exhaust outlet means leading rearwardly from said combustion chamber to direct exhaust gases to exhaust rearwardly from the rotor to effect a reaction force on the rotor during a stage subsequent to the third position of rotor displacement and thereby effect a driving torque on the rotor; and sealing means carried by the stator and operatively facing against the rotor outer face along the path of the outlet of said exhaust outlet means to operatively seal said exhaust outlet means during the third position of rotor displacement.

3. An engine means, comprising: a rotor; a stator; the rotor provided with an intermediate chamber; means for supplying fuel-air to said intermediate rotor chamber; the rotor provided with outlet means communicating with said intermediate rotor chamber and opening to an outlet port provided on a face of the rotor; the stator facing said rotor face in a substantially sealed relationship in the radial vicinity of said rotor outlet port to operatively seal said rotor outlet port when said rotor is in a first position of angular displacement; the stator provided with a chamber opening toward the rotor and communicable with said rotor outlet port at a second position of rotor displacement; the rotor being provided with a combustion chamber opening to the rotor face and communicable with the said stator chamber at a third position of rotor displacement to permit supplying of said rotor combustion chamber with fuel-air from said intermediate rotor chamber through said stator chamber; the rotor combustion chamber being provided with an exhaust outlet to direct exhaust gases to exhaust rearwardly from the rotor to effect a reaction force on the rotor during a stage subsequent to the third position of rotor displacement and thereby effect a driving torque on the rotor.

4. An engine means, comprising: a rotor; a stator; the rotor provided with an intermediate annular chamber; means for supplying air to said intermediate rotor chamber; the rotor provided with outlet means communicating with said intermediate rotor chamber and opening to an outlet port provided on a face of the rotor; means blocking flow of air through said rotor outlet means at a first position of rotor displacement; the stator provided with a chamber opening toward the rotor and communicable with said rotor outlet port at a second position of rotor displacement; the rotor being provided with a combustion chamber opening to the rotor face and communicable with said stator chamber at a third position of rotor displacement to permit supplying of said rotor combustion chamber with air through said stator chamber; means for supplying fuel to the rotor combustion chamber during a stage subsequent to the third stage of rotor displacement; the rotor combustion chamber being provided with an exhaust outlet means leading rearwardly from said combustion chamber to direct exhaust gases to exhaust rearwardly from the rotor to effect a reaction force on the rotor during a stage subsequent to the third position of rotor displacement and thereby effect a driving torque on the rotor.

5. An engine rotor, said rotor provided with an intermediate chamber, and with an inlet for supplying air to said intermediate rotor chamber; the rotor provided with outlet passageway means communicating with said intermediate rotor chamber and opening to an outlet port provided on a face of the rotor; the rotor being provided with a combustion chamber opening to the rotor face adjacent the said intermediate rotor chamber outlet port to permit supplying the combustion chamber with air from said intermediate rotor chamber through associated communicating passageways; the rotor combustion chamber being provided with an exhaust outlet means leading rearwardly from said combustion chamber to direct exhaust gases to exhaust rearwardly from the rotor to effect a reaction force on the rotor and thereby effect a driving torque on the rotor.

6. An engine means, comprising: a rotor; a stator; the stator being provided with an intermediate annular chamber; centrifugal compressor blading carried by the rotor for supplying fuel-air under pressure to said intermediate stator chamber; the stator carrying sealing means for generally sealing said intermediate chamber but provided with an outlet opening to communicate the intermediate chamber with the rotor; the rotor operatively sealing said outlet opening at a first position of rotor displacement; the rotor provided with a combustion chamber; the rotor combustion chamber provided with an inlet opening in the rotor face at substantially the same radial distance from the axis of rotor rotation as the said sealing means outlet opening, and thus permitting communication of said stator intermediate chamber with said rotor combustion chamber at a second position of rotor displacement; the rotor combustion chamber being provided with an exhaust outlet means leading rearwardly from said combustion chamber to direct exhaust gases to exhaust rearwardly from the rotor to effect a reaction force on the rotor during a subsequent third stage of rotor displacement and thereby effect a driving torque on the rotor; sealing means carried by the stator and operatively facing against the rotor face along the path of the outlet of said exhaust means to operatively seal said exhaust outlet means during the second stage of rotor displacement; ignition means for firing the fuel-air charge in said rotor combustion chamber after movement of the rotor to a third position of rotor displacement has carried the rotor combustion chamber inlet opening operatively past and out of communication with said stator sealing means opening; and reaction blading carried by the stator forwardly of the exhaust outlet sealing means of the stator and adapted to be operatively impinged upon by the exhaust gases discharged from the combustion chamber; the stator provided with exhaust passageway means extending interiorly of the stator in heat-transfer proximity to said intermediate stator chamber, to provide thermal economizing for fuel-air to be delivered to the combustion chamber; the rotor being provided with axially-extending passageway means for imparting pressure to the face of the rotor opposite rotor compressor blading to effect a substantial pressure balance of the rotor.

7. An engine means, comprising: a rotor; a stator; the stator being provided with an intermediate chamber; a wall of the stator and a face of the rotor co-operating to provide a compression chamber; compressor blading carried by the rotor for compressing fuel-air in said compression chamber for supplying fuel-air under pressure to said intermediate stator chamber; the stator carrying sealing means for generally sealing said intermediate chamber but provided with an outlet opening to communicate the said intermediate chamber with the rotor; the rotor provided a combustion chamber; the rotor combustion chamber provided with an inlet operatively opening onto the said communicating opening of the stator and thus permitting communication of said stator intermediate chamber with said rotor combustion chamber at an advanced position of rotor displacement; the rotor combustion chamber being provided with an exhaust outlet means leading rearwardly from said combustion chamber to direct exhaust gases to exhaust rearwardly from the rotor to effect a reaction force on the rotor during a subsequent stage of rotor displacement and thereby effect a driving torque on the rotor.

8. An engine means, comprising: a rotor; a stator; the stator being provided with an intermediate chamber; means for supplying fuel-air under pressure to said intermediate stator chamber; the stator carrying sealing means for generally sealing said intermediate chamber but provided with an inlet to receive fuel-air and with an outlet opening to communicate the said intermediate chamber with the rotor; the rotor sealing said communicating stator opening at a first position of rotor displacement; the rotor provided with a combustion chamber; the rotor combustion chamber provided with an inlet operatively opening onto the said communicating opening of the stator and thus permitting communication of said stator intermediate chamber with said rotor combustion chamber at a second position of rotor displacement; the rotor provided with passage means leading from the combustion chamber to a face of the rotor removed from said rotor combustion chamber inlet, and the stator provided with ignition means registrable with said rotor passage means at a subsequent third stage of rotor displacement, thereby to effect a firing of a fuel-air charge in the combustion chamber; the rotor combustion chamber being provided with an exhaust outlet means leading rearwardly from said combustion chamber to direct exhaust gases to exhaust rearwardly from the rotor to effect a reaction force on the rotor during the said third stage of rotor displacement and thereby effect a driving torque on the rotor.

References Cited in the file of this patent

UNITED STATES PATENTS

| | | |
|---|---|---|
| 1,588,632 | Sullivan | June 15, 1926 |
| 1,868,143 | Heinze | July 19, 1932 |
| 1,887,001 | Zetterberg | Nov. 8, 1932 |
| 2,188,128 | Armstrong | Jan. 23, 1940 |
| 2,448,972 | Gizara | Sept. 7, 1948 |
| 2,850,250 | Smith | Sept. 2, 1958 |

FOREIGN PATENTS

| | | |
|---|---|---|
| 733,074 | France | June 28, 1932 |
| 116,770 | Great Britain | June 26, 1918 |
| 469,180 | Great Britain | July 20, 1937 |